US007827298B2

(12) United States Patent
Black et al.

(10) Patent No.: US 7,827,298 B2
(45) Date of Patent: Nov. 2, 2010

(54) PEER-TO-WEB MEDIA BROADCASTING AND MANAGING ONLINE PUBLISHER COMPUTERS

(75) Inventors: Tyler James Black, Victoria (CA); Dylan John Hansen, Victoria (CA); Leonard Harley, Victoria (CA); Ronald Loren Kirkby, San Diego, CA (US); James Ormond Loucks, Victoria (CA); Seamus Gregory Davis O'Connor, Victoria (CA); Brian Charles Oraas, Victoria (CA); Kevin Justin Slagboom, Victoria (CA); Colby James Magee Smith, Victoria (CA); Ronald William Stevens, Vancouver (CA); Bryn Adam Aspestrand, White Rock (CA)

(73) Assignee: Mixpo Portfolio Broadcasting, Inc., Seattle, WA (US)

( * ) Notice: Subject to any disclaimer, the term of this patent is extended or adjusted under 35 U.S.C. 154(b) by 495 days.

(21) Appl. No.: 11/584,405

(22) Filed: Oct. 20, 2006

(65) Prior Publication Data
US 2008/0098101 A1 Apr. 24, 2008

(51) Int. Cl.
*G06F 15/16* (2006.01)
(52) U.S. Cl. .................................... 709/231
(58) Field of Classification Search ............... 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360; 705/5, 705/6, 1, 28, 26, 27, 56, 35, 37, 44, 10, 14, 705/30, 7
See application file for complete search history.

(56) References Cited

U.S. PATENT DOCUMENTS

| 6,249,810 | B1* | 6/2001 | Kiraly .................. 709/217 |
| 6,332,163 | B1* | 12/2001 | Bowman-Amuah ......... 709/231 |
| 6,442,598 | B1* | 8/2002 | Wright et al. ............... 709/217 |
| 2005/0071240 | A1* | 3/2005 | Ewald .................. 705/26 |
| 2006/0031407 | A1* | 2/2006 | Dispensa et al. ........... 709/219 |
| 2006/0095471 | A1* | 5/2006 | Krikorian et al. ........ 707/104.1 |
| 2006/0174277 | A1* | 8/2006 | Sezan et al. .................. 725/46 |

* cited by examiner

*Primary Examiner*—Nathan Flynn
*Assistant Examiner*—Mark O Afolabi
(74) *Attorney, Agent, or Firm*—Soquel Group LLC

(57) ABSTRACT

A system for peer-to-web media broadcasting, including a plurality of publisher computers, for broadcasting media over the Internet, each publisher computer including a video transcoder, and an image processor, a plurality of HTTP web client computers for viewing broadcasted media, an application server for transmitting web page content to HTTP web client computers, including a database management system for storing and retrieving publisher authentication information, at least one switchboard server, for managing TCP/IP connections between online publisher computers and HTTP web client computers, a load balancer for distributing incoming client requests among the at least one switchboard server, and a storage volume that is mounted on each of the at least one switchboard servers, for caching portions of media received from publishing computers. A method and computer-readable storage media are also described and claimed.

13 Claims, 11 Drawing Sheets

PEER-TO-WEB MEDIA BROADCASTING AND MANAGING ONLINE PUBLISHER COMPUTERS

FIELD OF THE INVENTION

The subject invention relates to multimedia broadcasting over the Internet.

BACKGROUND OF THE INVENTION

Conventional digital video broadcasting systems operate by hosting individuals' video clips on a central server computer, and serving them to client computers for viewing upon request. News clips, video conferences and consumer videos are all distributed from a central host server.

Use of a central server for broadcasting video clips has several drawbacks. The owner of the video clips has limited control over the broadcast of his clips, and who is permitted to view them. Updating or replacing video clips requires upload of updated or replacement clips, and issuance of instructions to the server to remove the old clips and post the new ones. Seemingly simple tasks such as renaming or reorganizing of video clips requires sending accurate instructions to the server, and often such tasks only take effect after a time period such as 24 hours. Preferred ways of screening the public from viewing private video clips are generally not possible. Upload of large video clips to a central server can be very time consuming. Original video clips hosted on a central server can be pirated.

SUMMARY OF THE DESCRIPTION

The subject invention concerns a system and method for peer-to-web broadcasting. Using the subject invention, a user of a client computer can broadcast his media over the web. The user's media can be viewed within conventional web browsers that use conventional media players, such as a Windows Media Player or a Macromedia Flash player control. Media players are generally available on most platforms and web browsers. As such, the subject invention does not require additional viewing software. The broadcaster, also referred to as a publisher, can organize his media into multiple broadcast channels, which viewers can then select from for viewing.

The subject invention overcomes drawbacks of conventional video broadcasting technology that uses a central server. Using the subject invention, an owner of video clips has complete control over the broadcast of his clips, and the people who have viewing privileges. No upload to a central hosting server is required. No coordination of instructions with a hosting server is required. No time is wasted uploading videos to a central server. The subject invention does not copy source files or upload source files to a central server. Media is prepared on a local client computer for web delivery, and original video clips are protected against copyright piracy.

The subject invention is particularly advantageous for independent filmmakers, artists and musicians, who can use peer-to-web broadcasting to show their media to potential employers, licensees and other such business leads. Broadcasters can set their broadcast channels as public, in which case they can be searched and found by the general public. Alternatively, broadcasters can set their broadcast channels as unlisted, in which case they can be viewed by invitation only.

The subject invention is also particularly advantageous for consumers who wish to share their personal recorded video clips with friends and family. The invention enables them to establish private channels.

There is thus provided in accordance with an embodiment of the subject invention a system for peer-to-web media broadcasting, including a plurality of publisher computers, for broadcasting media over the Internet, each publisher computer including a video transcoder, and an image processor, a plurality of HTTP web client computers for viewing broadcasted media, an application server for transmitting web page content to HTTP web client computers, including a database management system for storing and retrieving publisher authentication information, at least one switchboard server, for managing TCP/IP connections between online publisher computers and HTTP web client computers, a load balancer for distributing incoming client requests among the at least one switchboard server, and a storage volume that is mounted on each of the at least one switchboard servers, for caching portions of media received from publishing computers.

There is further provided in accordance with an embodiment of the subject invention a system for peer-to-web media broadcasting, including a plurality of publisher computers, for broadcasting media over the Internet, each publisher computer including a video transcoder for streaming bit-rate targeted video data, and an image processor for applying graphical effects to images, a plurality of HTTP web client computers for viewing broadcasted media, an application server for transmitting web page content to HTTP web client computers, including a database management system for storing and retrieving publisher authentication information, a web proxy server, for managing TCP/IP connections between online publisher computers and HTTP web client computers, and a storage volume that is mounted on the web proxy server, for caching portions of media received from publishing computers.

There is yet further provided in accordance with an embodiment of the subject invention a method for peer-to-web media broadcasting, including transmitting, via a first TCP/IP connection, a web page to a web client computer for display, the web page including a list of at least one channel, and each channel including at least one video clip, wherein the at least one video clip are stored on a publisher computer, receiving a request from the web client computer to view a designated one of the at least one video clip, determining whether or not the designated video clip resides on a cache, if the designated video clip resides on the cache, then streaming, via a second TCP/IP connection, the designated video clip from the cache to the client computer for viewing, and if the designated video clip does not reside on the cache, requesting a stream for the designated video clip from the publisher computer via a TCP/IP connection which the publisher computer has previously established with a proxy computer, and saving the designated video clip on the cache.

There is additionally provided in accordance with an embodiment of the subject invention a computer-readable storage medium storing program code for causing a computing device to transmit, via a first TCP/IP connection, a web page to a web client computer for display, the web page including a list of at least one channel, and each channel including at least one video clip, wherein the at least one video clip are stored on a publisher computer, to receive a request from the web client computer to view a designated one of the at least one video clip, to determine whether or not the designated video clip resides on a cache, if the designated video clip resides on the cache, then to stream, via a second TCP/IP connection, the designated video clip from the cache to the client computer for viewing, and if the designated video clip does not reside on the cache, then to open a connection between the web client computer and the publisher computer, to cause the publisher computer to stream, via a second TCP/

IP connection, the designated video clip to the web client computer for viewing, and to save the designated video clip on the cache.

There is moreover provided in accordance with an embodiment of the subject invention a method for multicasting of digital media, including receiving a portion of media data from a media file, the media data being streamed from a publisher computer and intended for a first viewer, streaming the portion of media data to the first viewer, prior to the media data being received in its entirety, dynamically storing the portion of media data, receiving a request from a second viewer, to view the same media file, and streaming the stored portion of media data to the second viewer, prior to the media data being stored in its entirety.

There is further provided in accordance with an embodiment of the subject invention a computer-readable storage medium storing program code for causing a computing device to receive a portion of media data from a media file, the media data being streamed from a publisher computer and intended for a first viewer, to stream the portion of media data to the first viewer, prior to the media data being received in its entirety, to dynamically store the portion of media data, prior to the media data being received in its entirety, to receive a request from a second viewer, to view the same media file, and to stream the stored portion of media data to the second viewer, prior to the media data being stored in its entirety.

There is yet further provided in accordance with an embodiment of the subject invention a method for generating a web page that assembles content from a local host and multiple remote hosts, including bridging multiple domain hosts to a single domain, including generating a domain name server (DNS) entry for localhost.servername.com that maps to IP address 127.0.0.1, where "servername" is a name of a web server, so that a local host and multiple remote hosts appear to originate from a single domain.

There is additionally provided in accordance with an embodiment of the subject invention a computer-readable storage medium storing program code for causing a computing device to bridge multiple domain hosts to a single domain, by generating a domain name server (DNS) entry for localhost.servername.com that maps to IP address 127.0.0.1, where "servername" is a name of a web server, so that a local host and multiple remote hosts appear to originate from a single domain.

There is moreover provided in accordance with an embodiment of the subject invention a system for peer-to-portal media broadcasting, including a web portal including a portal web page, the portal web page including at least one inline frame for embedding external objects, a plurality of publisher computers, for broadcasting media over the Internet to said web portal, each publisher computer including a video transcoder for streaming bit-rate targeted video data, an application server for transmitting web pages to inline frames of the web portal, a web proxy server, for managing TCP/IP connections between online ones of the publisher computers and the web portal, and a storage volume that is mounted on the web proxy server, for caching portions of media received from the publishing computers.

BRIEF DESCRIPTION OF THE DRAWINGS

The subject invention will be more fully understood and appreciated from the following detailed description, taken in conjunction with the drawings in which.

DETAILED DESCRIPTION

The subject invention concerns peer-to-web broadcasting. Using the subject invention, a publisher can broadcast his media to the web from his peer computer, without uploading the media to a central server. As such the publisher retains complete control over his media assets, and who is able to view them.

Figure 1:
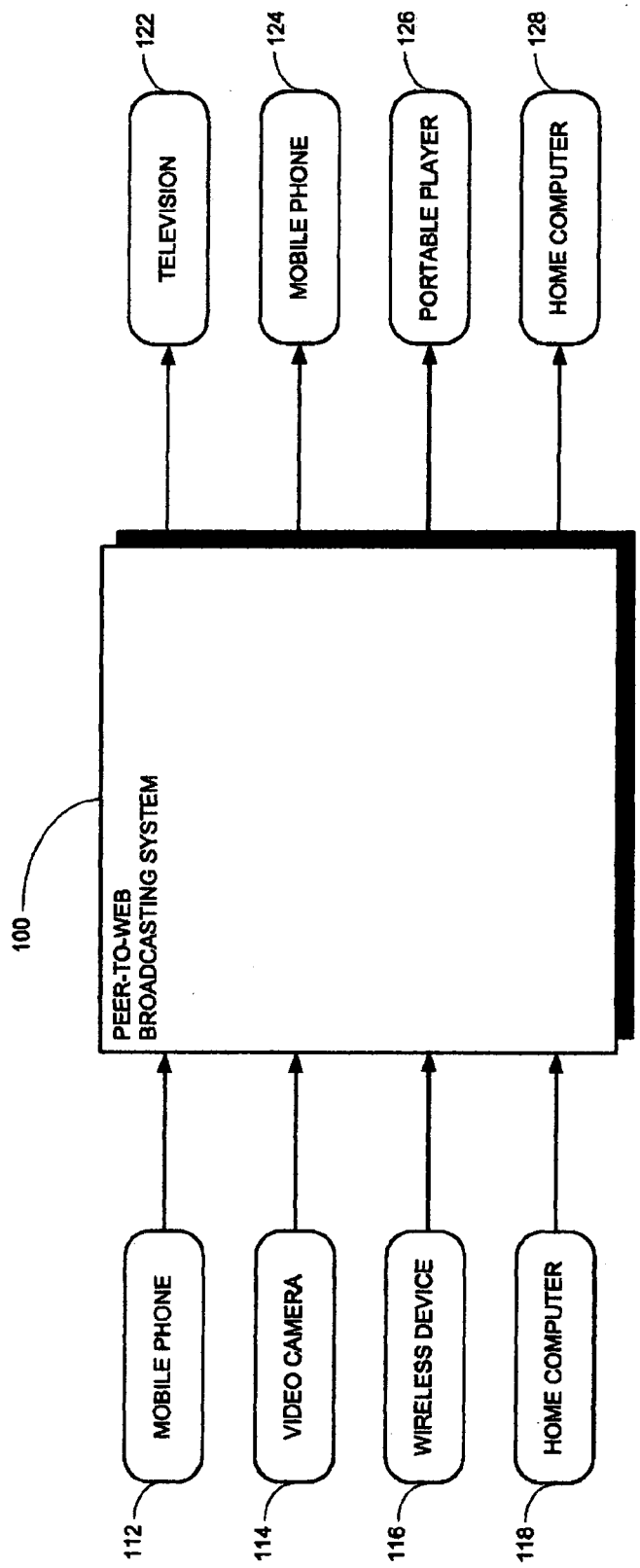
FIG. 1 is a simplified block diagram of a peer-to-broadcast system, in accordance with an embodiment of the subject invention.

Reference is now made to FIG. 1, which is a simplified block diagram of a peer-to-broadcast system, in accordance with an embodiment of the subject Invention. Shown in FIG. 1 is a broadcasting system 100 that enables peer computers, referred to as publishers, to broadcast media over the web. The publisher stores the media, and web clients can view the broadcast media using conventional web browsers, without requiring additional client software. The broadcast media can be live video, pre-recorded video, music, pictures, presentations, slideshows and other forms of media.

Media can be published on a mobile phone 112, a video camera 114, a wireless device 116, a home computer 118 and other such computing devices. Published media can be viewed on a television 122, a mobile phone 124, a portable player 126, a home computer 128 and other such computing devices that run a web browser.

Figure 2:
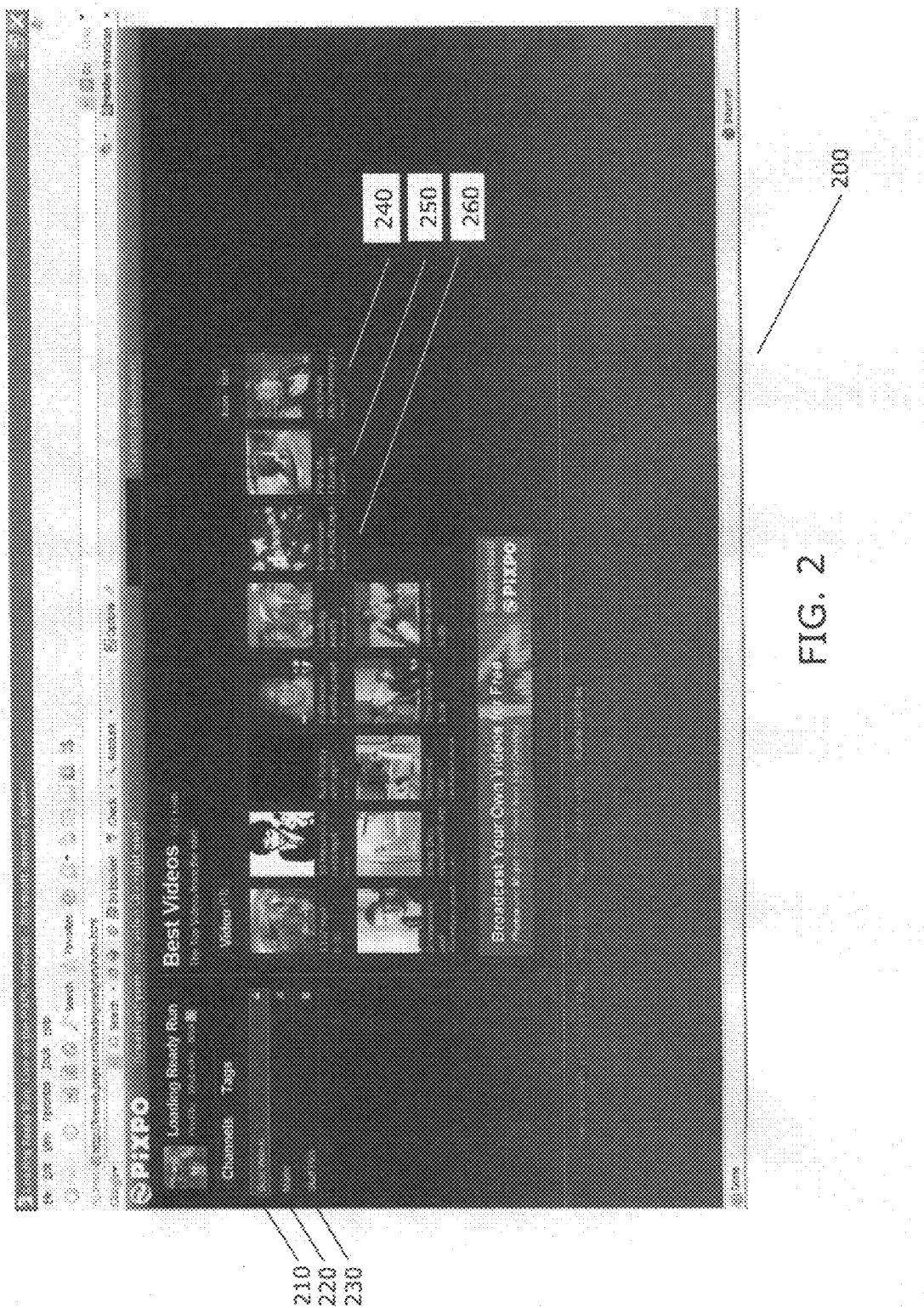
FIG. 2 shows a sample web page for viewing media on a web client computer, the media being broadcast from a peer computer in accordance with an embodiment of the subject invention.

Reference is now made to FIG. 2, which shows a sample web page 200 for viewing media on a web client computer, the media being broadcast from a peer computer in accordance with an embodiment of the subject invention. As can be seen in FIG. 2, web page 200 is displayed by a conventional web browser, such as Microsoft's Internet Explorer browser.

Shown in the upper left of web page 200 is a list of broadcast channels, each channel corresponding to a set of media related by a common theme that is generally the name of the channel. Channel 210 is named "Best Videos", and is currently the channel being displayed in web page 200. Channel 220 is named "Music" and channel 230 is named "Staff Pics". To the right of the list of channels is the set of media for the currently selected channel. Each piece of media is represented by a thumbnail, which is a small image that designates the media. Thus thumbnails 240, 250 and 260 correspond to videos from the "Best Videos" channel. By clicking on one of these thumbnails, a user can view the selected video within his web browser. The thumbnail images and the corresponding videos are stored on a peer computer of the publisher who created the channels.

Figure 3:
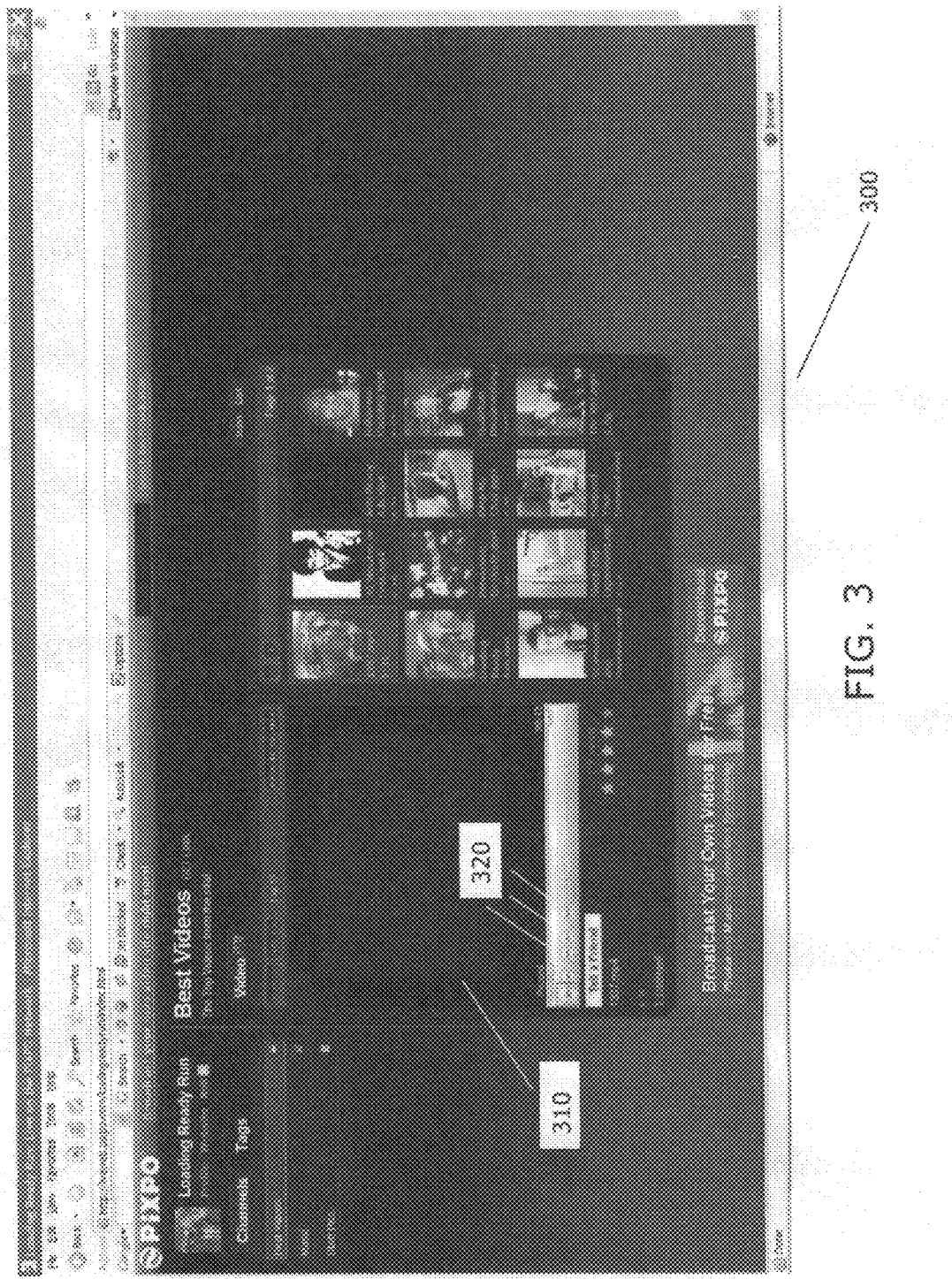
FIG. 3 shows a sample video viewing area overlaid on a sample web page, in accordance with an embodiment of the subject invention.

Reference is now made to FIG. 3, which shows a sample video viewing area overlaid on a sample web page 300, in accordance with an embodiment of the subject invention. When a user clicks on one of the video icons, such as icons 240, 250 or 260 of FIG. 2, the corresponding video is streamed to the user and played within a viewing area 310. Viewing area 310 includes typical video controls 320, for play/pause, stop, fast forward, fast reverse and volume control.

Generally, the web page for viewing published media is assembled from multiple sources, including inter alia:
(i) hosted programmatic and layout elements (graphics, CSS, JavaScript, HTML);
(ii) hosted content from broadcasting system 100 (FIG. 1);
(iii) local multi-media content (video, image thumbnails);
(iv) local data container elements (XML documents);
(v) multi-media content (video, image thumbnails) from multiple remote publisher computers; and
(vi) data container elements (XML documents) from multiple remote publisher computers.

Figure 4:
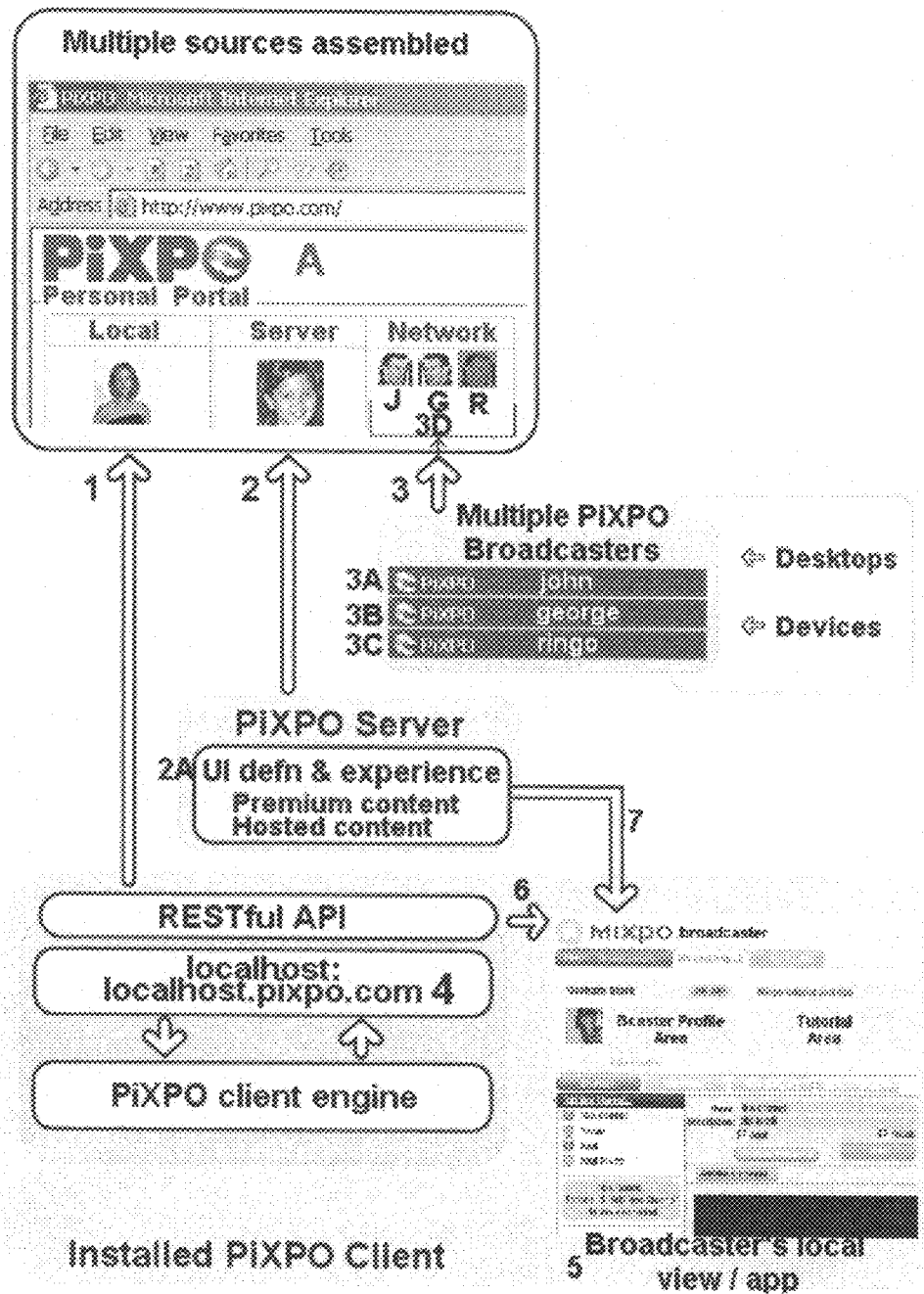
FIG. 4 is an illustration of a web page assembled from multiple sources, in accordance with an embodiment of the subject invention.

Reference is now made to FIG. 4, which is an illustration of a web page assembled from multiple sources (i)-(vi), in accordance with an embodiment of the subject invention. Shown at the top of FIG. 4 is a web page, denoted by A, rendered by a standard browser. Web page A includes components assembled from multiple sources.

A first source, denoted by 1, is local broadcast content. A local host server, denoted by 4, is treated as part of the domain for system 100 (FIG. 1), by including a DNS entry for "localhost.pixpo.com" which is mapped to 127.0.0.1, where "pixpo" is a web server name for system 100. It will be appreciated by those skilled in the art that effectively this DNS entry enables an Internet browser to treat the local host server as part of the domain for system 100. This is significant since web browser security policies generally require that dynamic content, such as iFrames and scripts, have a single domain of origin. The DNS entry thus enables web pages to be assembled from both local and remote endpoints without violating security policies enforced by the browser.

It will thus be appreciated by those skilled in the art that the subject invention bridges multiple domain hosts to a single domain, and facilitates communication between a local host and main page data through JavaScript. The subject invention enables access to information from any IP address via a sub-domain of an origin server. For example, if an HTML page is sent from www.mixpo.com, then that HTML page, via the subject invention's JavaScript bridge, can access any *.mixpo.com URL. Thus a DNS entry for "amazon.mixpo.com" can be mapped so that it resolves to Amazon's search API servers. JavaScript on a www.mixpo.com HTML page can then make remote data requests to Amazon's servers directly. Generally, such multiple calls to services from multiple domains are blocked by a browser's single origin security policy. Using the subject invention, however, a browser makes multiple connections to multiple services because of the JavaScript bridge, which maps an external domain, such as amazon.com, to an internal domain, such as amazon.mixpo.com. The browser then allows these connections, even though they connect to external domains.

In distinction, prior art technology, such as Google's "IG" pages, assembles multiple components into a page by assembling the page completely on central servers before sending it to a browser.

A second source, denoted by 2, is content from a broadcasting system 100. A third source, denoted by 3A, 3B and 3C, is content from multiple remote broadcasters John, George and Ringo desktop computers or other computing devices. Source 3 also includes data content 3D.

Shown at the bottom right of FIG. 4 is a web page, denoted by 5, for a broadcaster. Web page 5 also includes components assembled from multiple sources. A first source, denoted by 6, is local broadcast content. A second source, denoted by 7, is content from broadcasting system 100.

As shown in FIG. 4, source 1 for local content uses a Representational State Transfer (REST) application programming interface (API), for communicating with web page A and web page 5. Information about REST is available on the Internet at http://en.wikipedia.org/wiki/Representational_State_Transfer.

Figure 5:
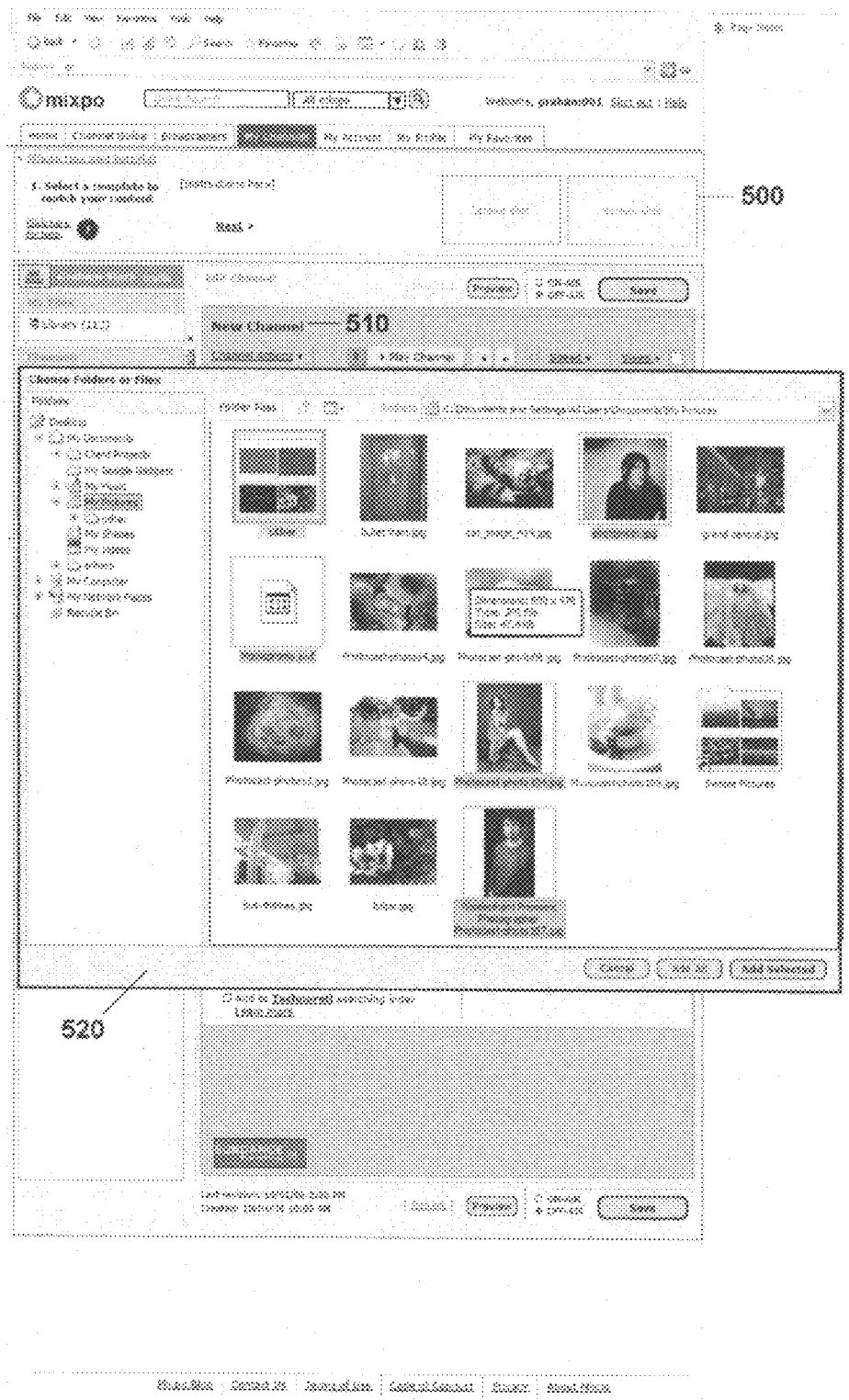
FIG. 5 shows a sample web page for publishing media on a peer computer, for web broadcast, in accordance with an embodiment of the subject invention.

Reference is now made to FIG. 5, which shows a sample web page 500 for publishing media on a peer computer, for web broadcast, in accordance with an embodiment of the subject invention. Web page 500 enables a publisher to create broadcast channels, such as the channels listed in FIG. 2, and to populate the channels with his media. As shown in FIG. 5, a publisher has created a new channel 510, temporarily named "New Channel", and an explorer-type window 520 enables the publisher to select media files from his file system to broadcast within the new channel. Channels can be designated as public, in which case they are made publicly available, or as unlisted, in which case they are only made available to friends that the publisher invites to see his media.

In accordance with an embodiment of the subject invention, information about publishers and their broadcast channels is stored in a central database, which can be queried by web clients in order to conduct searches for content.

Figure 6:
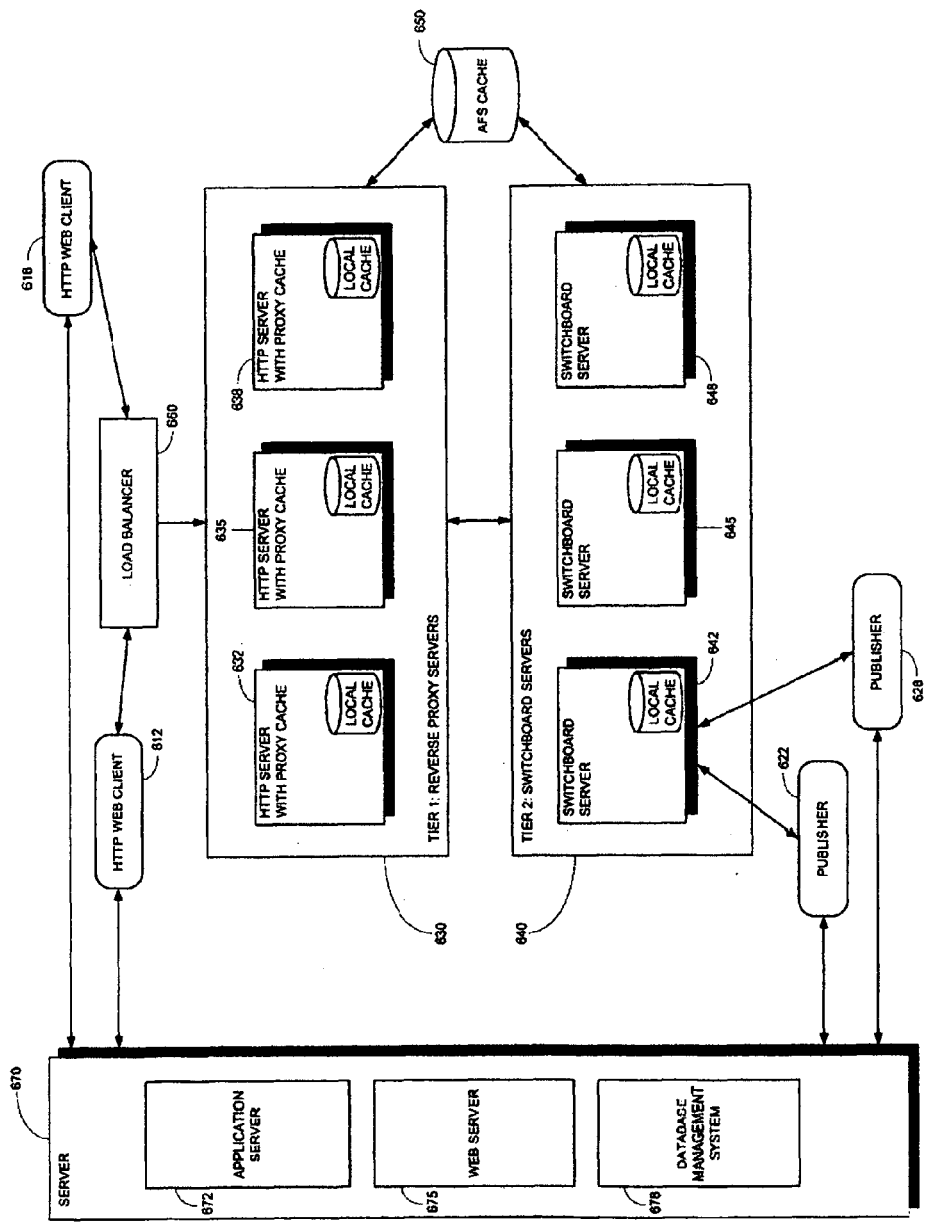
FIG. 6 is a simplified block diagram of a two-tier communication system for publishing media within the peer-to-broadcast system of FIG. 1, in accordance with an embodiment of the subject invention.

Reference is now made to FIG. 6, which is a simplified block diagram of a two-tier communication system for publishing media within the peer-to-broadcast system of FIG. 1, in accordance with an embodiment of the subject invention. As described hereinabove with respect to FIG. 1, the peer-to-broadcast system enables HTTP web clients 612 and 618 to view channels of media content broadcast by publishers 622 and 628.

The system shown in FIG. 6 includes two tiers of HTTP proxy servers; namely, a first tier 630 of reverse proxy servers 632, 635 and 638, and a second tier 640 of switchboard servers 642, 645 and 648. Each proxy server caches responses, generally in accordance with the HTTP standard, which enables it to serve many clients while making only a small number of requests to another server.

When a publisher logs on to a switchboard server, the switchboard server writes a file to a master Andrew File System (AFS) directory. The file is named according to the username of the publisher, and the file contains the switchboard server's host name. Reverse proxy servers search the AFS directory for that file, to determine which switchboard server to contact for a designated publisher. It will be appreciated by those skilled in the art that the AFS directory is essentially being used here as a database. Because multiple switchboard servers are able to write to the same file, cooperative locking is used. It will further be appreciated by those skilled in the art that the subject invention may use an actual database, instead of a master AFS directory, for this purpose of maintaining a switchboard directory.

A distinction between the first tier servers and the second tier servers lies in the request to the next server. Specifically, the first tier reverse proxy servers extract a username from an HTTP request, and search the master directory for a file with that name. The file contains the name of a switchboard server. The second tier switchboard servers extract a username from an HTTP request, find a connected publisher with that username, and forward a request to the connected publisher. If a switchboard server receives a request for a publisher who is not connected, the switchboard server returns a 503 HTTP response code. JavaScript in the web client browser receives this response and handles it appropriately; e.g., redirecting to a "user not connected" page.

Each proxy server accepts regular HTTP connections on port 80, and forwards HTTP requests to an upstream server. The origin server is a publisher computer, which returns either data or an error code.

As shown in FIG. 6, each proxy server has its own local cache. Cached items are indexed by URL, and each item has an expiration time and a cache validator. The cache validator is a last-modified date of an opaque identifier string, set by the origin server. If the URL is requested before it expires, its cached item is served right away from cache. Otherwise, if the URL has expired, a conditional request is made to the next server; i.e., to the switchboard server or to the origin server. The conditional request sends the cache validator to the next server. In turn, the next server uses the validator to determine whether the cached item for the URL is current. If the cached item is current, the next server returns an HTTP validation code, such as 304 Not Modified. Otherwise, if the cached data for the URL is not current, then the next server sends the updated data with an appropriate HTTP code, such as 200 OK.

In accordance with an embodiment of the subject invention, the HTTP proxy servers aggregate requests. When an HTTP proxy server receives three client requests for the same file, the file is fetched from the next server once, and served to all three clients. Aggregation occurs at each tier. Thus the reverse proxy servers aggregate many web clients, and the switchboard servers aggregate many reverse proxy servers. An HTTP proxy server does not invoke a second request for a specific URL while it is receiving a response for that URL. Instead, it adds a new client to the response being received. This mechanism protects publishers from receiving an excessive number of requests.

The HTTP proxy servers are indifferent as to content type. All requests are processed through the aggregation and caching mechanisms, and all responses are treated as data streams. HTTP supports "keep-alive connections" and reuses connections for different web clients.

A load balancer 660 is used to distribute web client requests among HTTP servers 632, 635 and 638.

A server 670 is used (i) to authenticate publishers, (ii) to manage the database of publishers, their broadcast channels, and their channel media content, and (iii) to serve up web content, such as HTML, XML and static graphic assets, to web clients and publishers, such as the web pages illustrated in FIG. 2-5 hereinabove. The video streams themselves are transmitted via the two tiers 630 and 640. Thus, referring to FIGS. 2 and 3, the content in web pages 200 and 300, and the broadcast channel information is transmitted from server 670 to web clients 612 and 618, and the video stream that is played in viewing area 310 is transmitted from the two tiers 630 and 640.

Server 670 includes an application server 672, a web server 675 and a database management system 678.

It will thus be appreciated by those skilled in the art that web page 300 synthesizes live content, static assets and hosted content in the same context. Specifically, content data via XML documents, and media objects are transmitted to web clients 612 and 618, and in turn the web clients transform and assemble the content, based on template pages served by server 670. Transformations and page display are performed using XSLT, JavaScript and HTML code. The subject invention's web page assembly technology enables displaying live content from multiple remote sources into a single web page. Multiple publisher content is assembled and presented in what appears to a user as a single coherent entity, whereas in fact it is a composite entity, built from multiple live broadcast sources.

It will also be appreciated by those skilled in the art that the architecture of FIG. 6 enables broadcast of multiple media streams from a single peer source; i.e., one-to-many broadcast from a single peer machine to multiple simultaneous viewers.

Details of operation of components of the system of FIG. 6 are described hereinbelow.

HTTP Servers 632, 635 and 638

Firewalls and NAT routers are being used in over 50% of home broadband users today. Nearly all firewalls and NAT routers block unsolicited inbound network traffic, which creates an obstacle for systems that involve peers on the Internet. One solution to overcoming this obstacle uses an intermediate Internet host to proxy network traffic. Firewalls and NAT routers generally block inbound traffic, but outbound traffic is allowed. Since TCP/IP is bidirectional, once a peer computer behind a firewall or NAT router establishes a connection to another host, that host can then send data back to the peer through the TCP/IP connection. Switchboard servers 642, 645 and 648 function as intermediate hosts.

HTTP servers 632, 635 and 638 also enable connections to publishers with dynamically assigned IP addresses. Specifically, these servers enable broadcasters to be connected to web clients using browsers that point to standard URLs. For example, if a publisher broadcasts from his home computer that has an internal IP address of 192.168.1.100 and a dynamically assigned IP address of 24.66.77.88, then HTTP servers enable the publisher to appear as http://liveweb.pixpo.com/john, and to serve content to a standard web client. The publisher does not have to run an HTTP server, and does not have to create a port for forwarding configurations for his NAT devices.

The architecture in FIG. 6 does not rely on a "thread-per-connection" approach for publishers 622 and 628. It has been found that a low commodity switchboard server can handle up to 20,000 simultaneous connections.

In accordance with an embodiment of the subject invention, HTTP servers 632, 635 and 638 operate as a cluster, with automatic dynamic failover in the event of a proxy failure.

HTTP servers 632, 635 and 638 run their proxies as a service. Proxy services have configurable options, including inter alia the options listed in TABLE I.

TABLE I

Configurable options for HTTP servers

| | |
|---|---|
| Ports for the server to listen on | HTTP listen port<br>Reference to an AFS-hosted file which stores the switchboard server addresses |
| Log files | General (for general monitoring and debugging)<br>Access (Apache log file compatible)<br>Pid (for Linux service management) |
| Cache | Cache directory (path to a large volume)<br>Cache minimum expire time |

Switchboard Servers 642, 645 and 648

Switchboard servers 642, 645 and 648 maintain connection tables with records of connections between HTTP web clients and publishers.

A load-balancing algorithm, based on least-loaded switchboard, is used to designate a switchboard server for each publisher. As such, generally any given publisher can connect to any switchboard server.

Switchboard servers 642, 645 and 648 run their switchboards as a service. Switchboard services have configurable options, including inter alia the options listed in TABLE II.

TABLE II

Configurable options for switchboard servers

| | |
|---|---|
| Ports for the server to listen on | HTTP (HTTP servers should be configured to use this port)<br>Switchboard (logon server should direct publishers to use this port)<br>SOAPAdmin |
| Log files | General (for general monitoring and debugging)<br>Access (Apache log file compatible)<br>Pid (for Linux service management) |
| HTTP proxy | URLs for error page response lookups<br>Cache directory (path to a large volume)<br>Cache minimum expire time |

Cache 650

Use of cache within the subject invention provides many advantages, including improved quality of service for web clients, and decreased load on publisher computers. In accordance with an embodiment of the subject invention, cache 650 is a large Andrew File System (AFS) volume, which all servers have access to. It has been found that a cache size of 200 GB suffices to hold several weeks' worth of data.

As shown in FIG. 6, each switchboard server and reverse proxy server features its own local cache. These caches reduce the amount of forwarded network requests necessary, and also support streaming incomplete portions of media files. In addition, the system includes the larger, global AFS cache 650, which stores complete media files. Switchboard servers write to this cache, and reverse proxy servers read from this cache.

In accordance with an embodiment of the subject invention, when a switchboard server receives a complete media file, it copies the media file to AFS cache 650, asynchronously from the HTTP request from the reverse proxy server. AFS cache 650 stores completely received media items from all switchboard servers. In general, dynamically generated items are not stored in AFS cache 650. Whether a file is dynamic or static is determined by the HTTP compliant cache policy specified by the response from a publisher. AFS cache 650 stores complete media items, and generally is not used for streaming.

In accordance with an embodiment of the subject invention, cache 650 is a size-limited file system-based most recently used (MRU) cache. Each item of content in the cache has a "last used" timestamp. When a new data item is pulled from a publisher, it is added to the cache. When a requested item is found in the cache, the requested item is promoted to the top of the cache by resetting its "last used" timestamp to the current time.

Further in accordance with an embodiment of the subject invention, a cache utility program monitors the space occupied by contents of cache 650. The cache utility program accepts as parameters a path to a cache directory and a pre-specified size. If the space occupied by the cache contents exceeds the pre-specified size, the cache utility program deletes least recently accessed items until the occupied space is sufficiently reduced. The cache utility program may be scheduled to run on a timer, such as once every 30 minutes.

Figure 7:
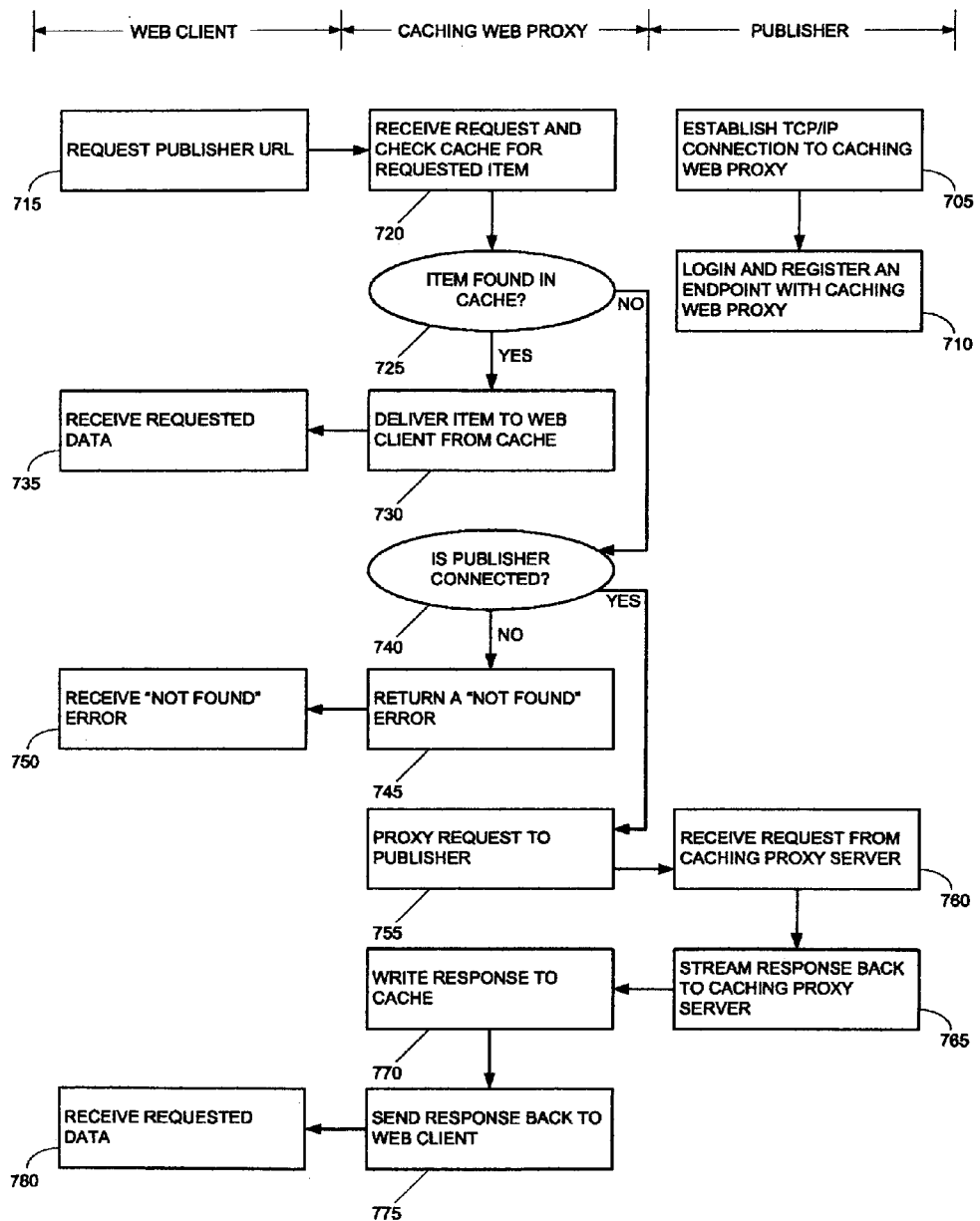
FIG. 7 is a simplified flow chart of a sequence of events within a peer-to-broadcast system, in accordance with an embodiment of the subject invention.

Reference is now made to FIG. 7, which is a simplified flow chart of a sequence of events within a peer-to-broadcast system, in accordance with an embodiment of the subject invention. The flowchart of FIG. 7 is divided into three columns. The leftmost column includes steps performed by a web client computer, such as web client 612 or 618 (FIG. 6), the middle column includes steps performed by a caching web proxy, such as HTTP server 632, 635 or 638, and the rightmost column includes steps performed by a publisher computer, such as publisher 622 or 628.

At step 705 the publisher requests to log on to an application server using HTTPS/XML messaging, and the publisher is directed to a switchboard proxy server, such as switchboard server 642, 645 and 648. At step 710 the publisher logs into the appropriate switchboard server and registers an endpoint, such as "/username/".

At step 715 a web client requests a publisher URL, such as http://live.pixpo.com/username/<media_file>. At step 720 the caching web proxy receives the request and checks its cache for the requested media item. If it is determined at step 725 that the media item is present in the cache, then at step 730 the item is delivered to the web client from the cache, and at step 735 the web client receives the data it requested. Otherwise, if it is determined at step 725 that the media item is not present in the cache, then a determination is made at step 740 whether or not the publisher is currently connected.

If the publisher is not connected, then at step 745 the caching web proxy returns a "not found" error, and at step 750 the web client receives the error message instead of the requested data. If the publisher is connected, then at step 755 the caching web proxy proxies the request to the publisher. At step 760 the publisher receives the request from the caching web proxy, and at step 765 the publisher streams a response back to the caching web proxy.

At step 770 the caching web proxy writes the response received from the publisher into its cache, and at step 775 the caching web proxy sends the response back to the web client. Finally, at step 780 the web client receives from the caching web proxy the data it requested.

In accordance with an embodiment of the subject invention, cached partially streamed files can be accessed from cache. I.e., a file does not have to be streamed to completion in cache and stored in its entirety as a file before it can be accessed from cache. If a viewer A starts watching a broadcast from publisher B, the proxy server begins streaming content to viewer A and caching it to file. If viewer C then starts watching the same content from publisher B, the proxy server detects this condition and begins streaming content to viewer C from the partially completed stream in the cache. It will be appreciated that this mechanism enables a "multi-cast" from a single source broadcast to a plurality of viewers.

Load Balancer 660

Load balancer 660 forwards requests to HTTP servers 632, 635 and 638 based on a segmenting algorithm.

Server 670, Application Server 672, Web Server 675 and Database Management System 678

Server 670 is responsible for orchestrating the entire delivery of static and live content from publisher to web client. Application server 672 is responsible for authenticating publisher logins. Web server 675 is responsible for transmitting HTML pages to publishers 622 and 628 and to web clients 612 and 618. Database management system 678 is responsible for managing a database that stores publisher broadcast channels and their media contents.

Figure 8:
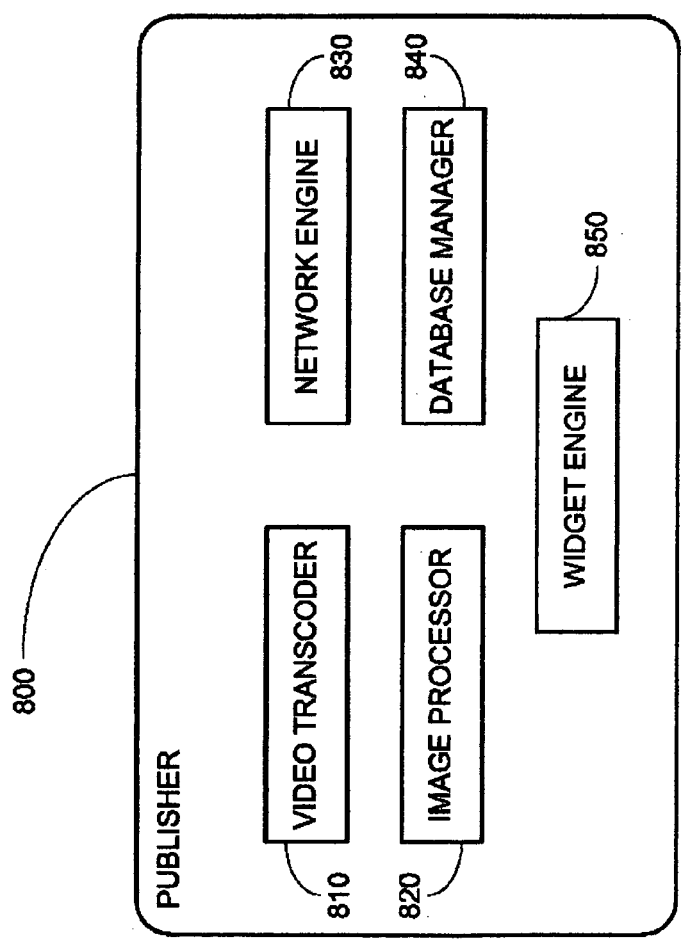
FIG. 8 is a simplified block diagram of a publisher system, for publishing media within the peer-to-broadcast system of FIG. 1, in accordance with an embodiment of the subject invention.

Reference is now made to FIG. 8, which is a simplified block diagram of a publisher system 800, for publishing media within the peer-to-broadcast system of FIG. 1, in accordance with an embodiment of the subject invention. System 800 generally resides on publisher computers 622 and 628 (FIG. 6), although in an alternate embodiment system 800 may reside within web application 670. As shown in FIG. 8, publisher system 800 includes a video transcoder 810, for generating bit-rate targeted data streams, an image processor 820, a network engine 830, a database manager 840, and a widget engine 850. These components are described in detail hereinbelow.

In accordance with an embodiment of the subject invention, components 810-850 are accessed via an application programming interface (API). One such API is a Representational State Transfer (REST) interface. Information about REST is available on the Internet at http://en.wikipedia.org/wiki/Representational_State_Transfer. It will be appreciated by those skilled in the art that other APIs may also be used to interface components 810-850.

Video Transcoder 810

Video transcoder 810 includes a transcoder that generates bit-rate targeted data streams in one or more formats, including inter alia Microsoft Advanced Streaming Format (WMV), Macromedia Flash VP6 (FLV) and DivX Networks v5.x (AVI).

Image Processor 820

Image processor 820 includes graphic effects such as alpha channels for transparency, gradients and shadows. Image processor 820 also includes decoders for conventional image formats, including the recently established RAW camera format.

Network Engine 830

Network engine 830 includes messaging engines for client-to-client and client-to-server connections.

Database Manager 840

Database manager 840 includes an implementation of SQL. Database manager 840 also includes a command generator and sequencer.

Widget Engine 850

Widget engine 850 supports widget layers such as vectors, strings and maps. Widget engine 850 also includes MAPI support. Optionally, widget engine 850 may also include support for third party widgets.

Figure 9:
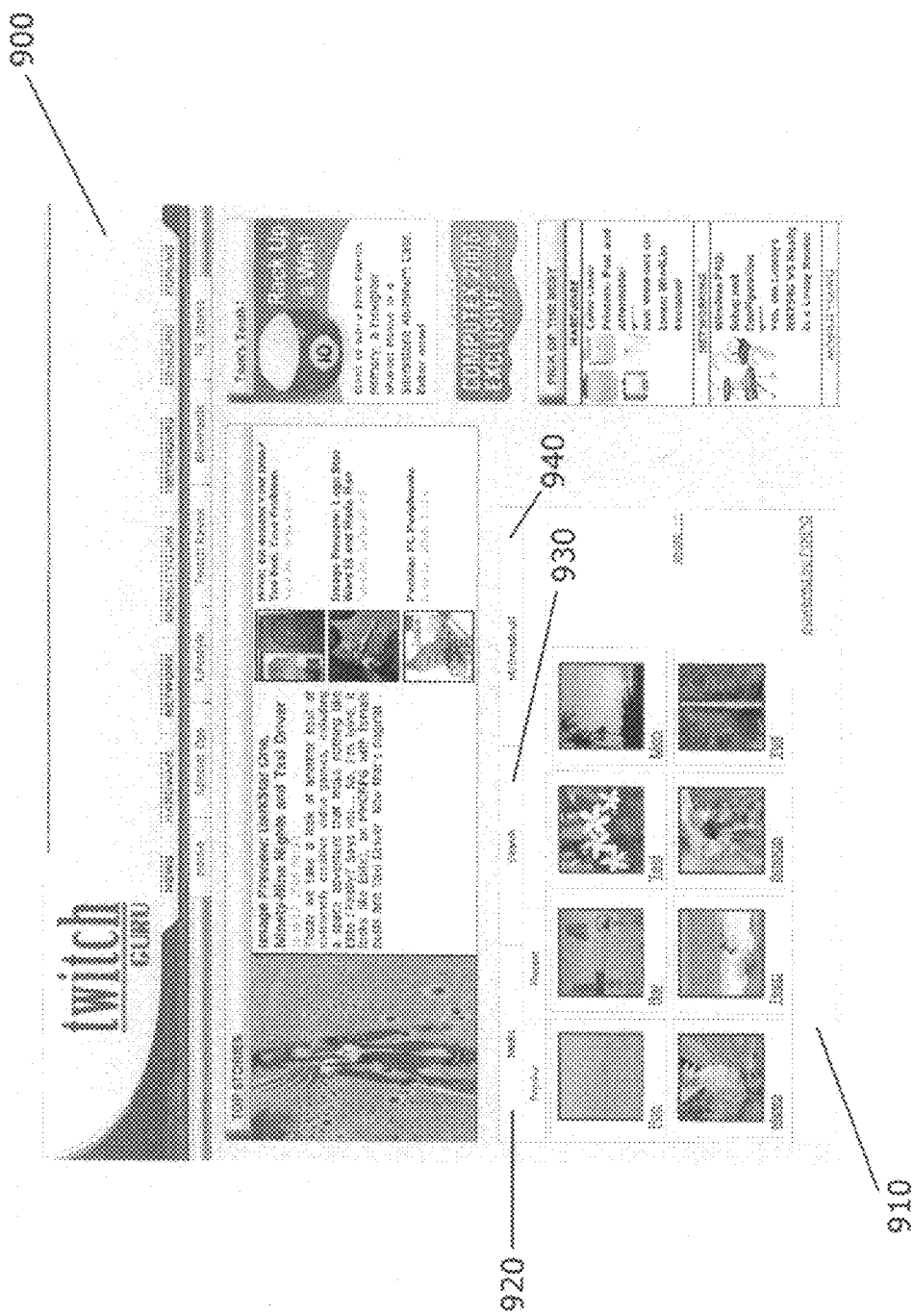
FIG. 9 shows a sample portal web page including an embedded portion broadcast from a publisher, in accordance with an embodiment of the subject invention.

In reading the above description, persons skilled in the art will realize that there are many apparent variations that can be applied to the methods and systems described. An important such variation is the ability for a publisher to broadcast his media to a web portal. Reference is now made to FIG. 9, which shows a sample portal web page 900 including an embedded portion broadcast from a publisher, in accordance with an embodiment of the subject invention. Portal web page 900 includes an inline frame (iFrame) 910, in which is displayed embedded media, broadcast by a publisher directly to the iFrame. In accordance with an embodiment of the subject invention, publisher system 800 enables broadcast of content into a portal iFrame.

An iFrame is an HTML construct that enables external objects to be included, such as an external HTML page. The source

<IFRAME> SRC=URI </IFRAME> is used to embed content from a specified universal resource identifier (URI) into a web page. iFrames can act as targets for other links.

When a user browsing portal web page 900 clicks on a media item in iFrame 910, a media player pops up, similar to the media player displayed in viewing window 310 of FIG. 2, and enables the user to interactively view the media item. In addition to the media player, information about the media item and its publisher is also displayed to the user.

The content displayed in iFrame 910 includes three main tabs: a "Media" tab 920, a "Search" tab 930 and a "MyBroadcast" tab 940. Media tab 920 contains a subset of publisher generated content. Search tab 930 enables keyword searches of content broadcast to the portal. MyBroadcast tab 940 enables a publisher to publish content to the portal, and to remove content that was already published to the portal.

It will be appreciated that the system architecture shown in FIG. 6 is but one example of an architecture that supports the peer-to-web broadcasting system of FIG. 1. Several other architectures can be used to implement the subject invention. To this end, reference is made to FIG. 10, which is a simplified block diagram of a single-tier communication system for publishing media within the peer-to-broadcast system of FIG. 1, in accordance with an alternate embodiment of the subject invention.

Figure 10:
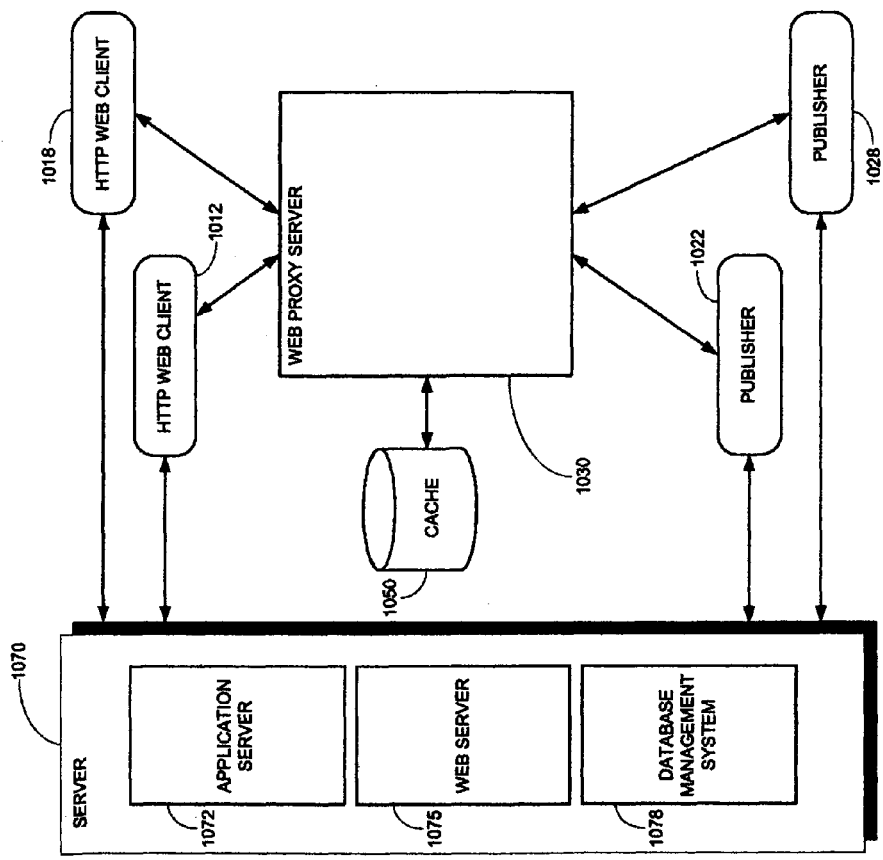
FIG. 10 is a simplified block diagram of a single-tier communication system for publishing media within the peer-to-broadcast system of FIG. 1, in accordance with an alternate embodiment of the subject invention.

The system of FIG. 10 differs from that of FIG. 6 in that the two-tier communication system of FIG. 6 is replaced by a single web proxy server that also functions as a switchboard that connects online publishers and viewers.

Figure 11:
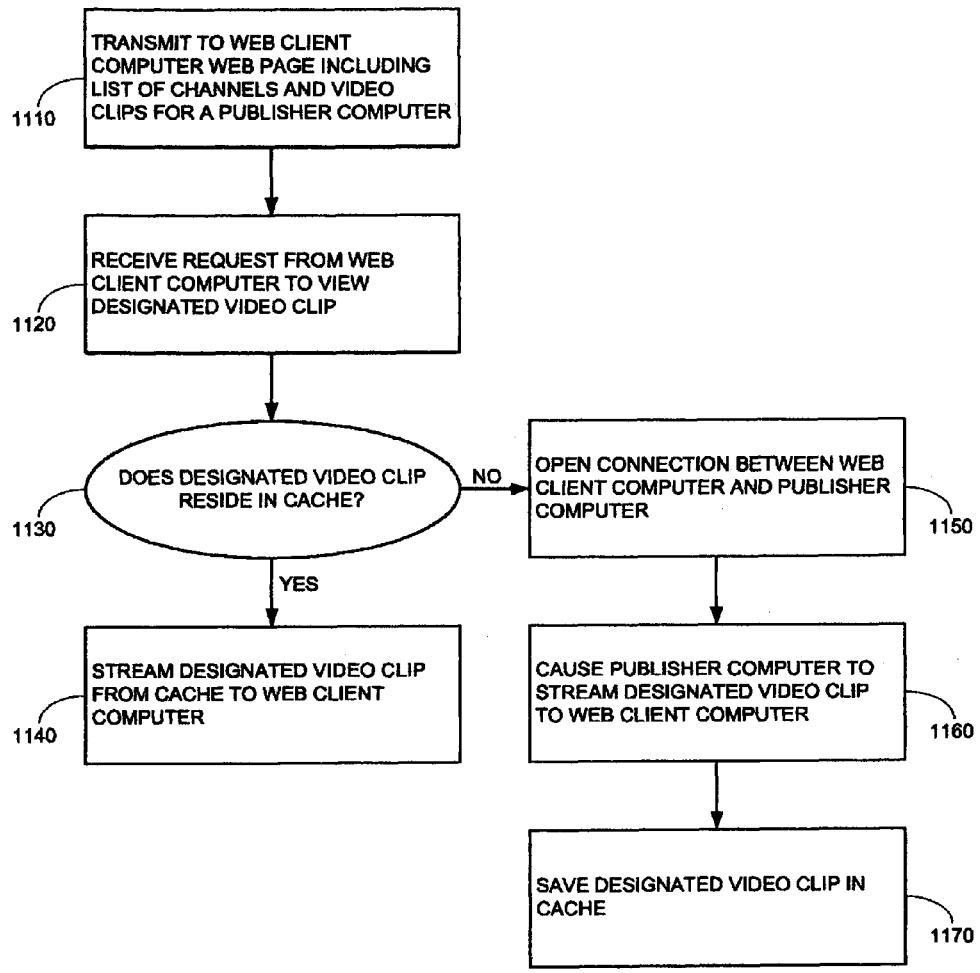
FIG. 11 is a simplified flowchart of a method for delivering combined static and live content from publisher to web client, in accordance with an embodiment of the subject invention.

Reference is now made to FIG. 11, which is a simplified flowchart of a method used by server 1070 to deliver combined static and live content from publisher to web client, in accordance with an embodiment of the subject invention. At step 1110, in response to an HTTP request from a web client, server 1070 transmits a web page to the web client for display to a user, the web page including a list of one or more video channels broadcast by a publisher, each channel including a list of one or more video clips, such as the web page illustrated in FIG. 2. The video clips are stored on the publisher computer, and the information for the channel names and for the names and thumbnails of the video clips is stored in a database, and retrieved by database management system 1078. Listings of video clips from various designated channels are transmitted from server 1070 to the web client, in response to user requests for video channel information.

At step 1120 server 1070 receives a request from the web client to view a designated one of the video clips. At step 1130 server 1070 determines whether or not the designated video clip already resides in its cache. If so, then at step 1140 server 1070 streams the designated video clip from its cache to the web client for viewing by the user. Otherwise, at step 1150 server 1070 opens a connection between the web client computer and the publisher computer. At step 1160 server 1070 causes the publisher computer to stream the designated video clip to the web client, for viewing by the user. Finally, at step 1170 server 1070 stores the designated video clip in its cache for future access.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for peer-to-web media broadcasting, comprising:
    a plurality of publisher computers, for storing publisher videos and images for broadcast over the Internet;
    a plurality of HTTP web client computers for viewing publisher videos and images broadcast over the Internet;
    a database management system that stores and retrieves information about said publisher computers and the videos and images that they broadcast, the database management system being accessible by said HTTP web client computers;
    a web server for transmitting content template pages to said HTTP web client computers, the content template pages comprising instructions for assembling the videos and images broadcast from one or more of said publisher computers; and
    at least one switchboard server, for transmitting a publisher video or image from a publisher computer to an HTTP web client computer, bypassing said web server, in response to a request from the HTTP web client computer for a publisher video or image linked to a content template page transmitted to the HTTP web client computer by said web server, and for managing TCP/IP connections between online publisher computers and HTTP web client computers, whereby the at least one switchboard server enables multiple videos and images from the same publisher computer to be transmitted to multiple web client computers at the same time.

2. The system of claim 1 wherein the content template pages transmitted by said web server include at least one of HTML content, XML content and static graphic content.

3. The system of claim 2 wherein said HTTP web client computers include page transformers for transforming the videos and images broadcast from one or more of said publisher computers in accordance with instructions in the content template pages.

4. The system of claim 3 wherein said transformers use at least one of XSLT, JavaScript and HTML code.

5. A system for peer-to-web media broadcasting, comprising:
    a plurality of publisher computers, for storing publisher videos and images for broadcast over the Internet;
    a plurality of HTTP web client computers for viewing publisher videos and images broadcast over the Internet;
    a database management system that stores and retrieves information about publisher computers and the publisher videos and images that they broadcast, the database management system being accessible by said HTTP web client computers;
    a web server for transmitting content template pages to said HTTP web client computers, the template pages comprising instructions for assembling the videos and images broadcast from one or more of said publisher computers; and
    a web proxy server, for transmitting a publisher video or image from a publisher computer to an HTTP web client computer, bypassing said web server, in response to a request from the HTTP web client computer for a publisher video or image linked to a content template page transmitted to the HTTP web client computer by said web server, and for managing TCP/IP connections between online publisher computers and HTTP web client computers, whereby the web proxy server enables multiple videos and images from the same publisher computer to be transmitted to multiple web client computers at the same time.

6. The system of claim 5 wherein the content template pages transmitted by said web server include at least one of HTML content, XML content and static graphic content.

7. The system of claim 6 wherein said HTTP web client computers include page transformers for transforming the videos and images broadcast from one or more of said publisher computers in accordance with instructions in the content template pages.

8. The system of claim 7 wherein said transformers use at least one of XSLT, JavaScript and HTML code.

9. A method for peer-to-web media broadcasting, comprising:
    transmitting, via a first TCP/IP connection, a web page to a web client computer for display, the web page including a list of at least one channel, and each channel including at least one video clip, wherein the at least one video clip are stored on a publisher computer;
    receiving a request from the web client computer to view a designated one of the at least one video clip;
    determining whether or not the designated video clip resides on a cache;
    if the designated video clip resides on the cache, then streaming, via a second TCP/IP connection, the designated video clip from the cache to the client computer for viewing; and
    if the designated video clip does not reside on the cache, then
        requesting a stream for the designated video clip from the publisher computer to the client computer, via a TCP/IP connection that the publisher computer previously established with a proxy server; and
        saving the designated video clip on the cache.

10. A non-transitory computer-readable storage medium storing program code for causing a computing device:
    to transmit, via a first TCP/IP connection, a web page to a web client computer for display, the web page including a list of at least one channel, and each channel including at least one video clip, wherein the at least one video clip are stored on a publisher computer;
    to receive a request from the web client computer to view a designated one of the at least one video clip;
    to determine whether or not the designated video clip resides on a cache;
    if the designated video clip resides on the cache, then to stream, via a second TCP/IP connection, the designated video clip from the cache to the client computer for viewing; and
    if the designated video clip does not reside on the cache, then to request a stream for the designated video clip from the publisher computer to the client computer, via a TCP/IP connection that the publisher computer previously established with a proxy server; and
    to save the designated video clip on the cache.

11. A method for multicasting of digital video, comprising:
- receiving portions of video content from a publisher computer and intended for a first viewer located remotely from the publisher computer;
- streaming a first portion of the video content to the first viewer, prior to other portions of the media content having been received;
- dynamically storing the first portion of the video content;
- subsequently receiving a request from a second viewer, located remotely from the publisher computer and remotely from the first viewer, to view the video content; and
- streaming the stored first portion of the video content to the second viewer, while simultaneously streaming an additional portion of the video content to the first viewer, prior to other portions of the video content having been received.

12. A non-transitory computer-readable storage medium storing program code for causing a computing device:
- to receive portions of video content intended for a first viewer, from a publisher computer located remotely from the first viewer;
- to stream a first portion of the video content to the first viewer, prior to other portions of the video content having been received;
- to dynamically store the first portion of the video content;
- to subsequently receive a request from a second viewer, located remotely from the publisher computer and remotely from the first viewer, to view the video content; and
- to stream the stored first portion of the video content to the second viewer while simultaneously streaming an additional portion of the video content to the first viewer, prior to other portions of the video content having been received.

13. A system for peer-to-portal media broadcasting, comprising:
- a web portal including a portal web page, the portal web page including at least one inline frame for embedding external objects;
- a plurality of publisher computers, for storing publisher videos for broadcast over the Internet to said web portal;
- a web server for transmitting content template pages to inline frames of said web portal, the content template pages comprising instructions for assembling videos broadcast from one or more of said publisher computers; and
- a web proxy server for transmitting a publisher video from a publisher computer to said web portal, bypassing said web server, in response to a request from said web portal for a publisher video linked to a content template page transmitted by said web server, and for managing TCP/IP connections between online ones of said publisher computers and said web portal, whereby the web proxy server enables multiple videos from the same publisher computer to be transmitted to the web portal at the same time.

\* \* \* \* \*